(12) United States Patent
Fredericksen (10) Patent No.: US 8,499,351 B1
(45) Date of Patent: Jul. 30, 2013

(54) ISOLATED SECURITY MONITORING SYSTEM

(75) Inventor: Robin Eric Fredericksen, Trabuco Canyon, CA (US)

(73) Assignee: McAfee, Inc., Santa Clara, CA (US)

( * ) Notice: Subject to any disclaimer, the term of this patent is extended or adjusted under 35 U.S.C. 154(b) by 546 days.

(21) Appl. No.: 12/641,092

(22) Filed: Dec. 17, 2009

(51) Int. Cl.
*G06F 21/00* (2006.01)

(52) U.S. Cl.
USPC .............................. 726/24; 709/224; 717/127

(58) Field of Classification Search
USPC ....... 726/22–27; 717/127–128; 709/223–225; 714/10–11
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,337,081 B1* | 2/2008 | Kagan | 702/60 |
| 7,506,155 B1 | 3/2009 | Stewart et al. | |
| 7,774,762 B2* | 8/2010 | Rochette et al. | 717/138 |
| 7,937,757 B2* | 5/2011 | Focke et al. | 726/22 |
| 8,037,350 B1* | 10/2011 | Aggarwal et al. | 714/11 |
| 2005/0033978 A1* | 2/2005 | Hyser | 713/200 |
| 2005/0039018 A1* | 2/2005 | Wittkotter | 713/176 |
| 2006/0179487 A1* | 8/2006 | Hatakeyama | 726/26 |
| 2007/0074071 A1* | 3/2007 | Rothman et al. | 714/10 |
| 2007/0079178 A1* | 4/2007 | Gassoway | 714/38 |
| 2009/0049550 A1* | 2/2009 | Shevchenko | 726/23 |

OTHER PUBLICATIONS

Computer virus—Wikipedia, the free encyclopedia [online] [Retrieved Dec. 17, 2009]. Retrieved from the Internet: http://en.wikipedia.org/wiki/Computer_virus, 11 pages.

Hunter, G. Ken and Rowe, Neil C., "Software Design for a Fault-Tolerant Communications Satellite," [online], 2000. Retrieved from the Internet: http://www.dtic.mil/cgi-bin/GetTRDoc?AD=ADA458050& Location= U2& doc= GetTRDoc.pdf, 18 pages.

Mahmood, Aamer and McCluskey, E. J., "Concurrent Error Detection Using Watchdog Processors—A Survey," IEEE Transactions on Computers, vol. 37, No. 2, Feb. 1988, pp. 160-174.

Rootkit—Wikipedia, the free encyclopedia [online] [Retrieved Dec. 17, 2009]. Retrieved from the Internet: http://en.wikipedia.org/wiki/Rootkit, 10 pages.

* cited by examiner

*Primary Examiner* — Hadi Armouche
(74) *Attorney, Agent, or Firm* — Patent Capital Group (57) ABSTRACT

Methods, systems, and apparatus, including computer programs encoded on computer storage media, for security monitoring. In one aspect, a device includes an integrated processing unit, including a user system and an auditor system. The user system includes a first processor and a first computer storage medium. The auditor system includes a second processor that is isolated from the first processor and a second computer storage medium that is isolated from the first computer storage medium. The second computer storage medium stores instructions that cause the second processor to load auditing data in isolation from the user system, monitor processes on the user system, determine from the auditing data that one of the processes is an unauthorized process, and perform one or more security processes on the unauthorized process.

27 Claims, 9 Drawing Sheets

ISOLATED SECURITY MONITORING SYSTEM

BACKGROUND

This specification relates to malware detection.

Security breaches occur when malware is loaded onto a user system. Examples of malware include adware, spyware, computer viruses, root kits, worms, and Trojan horses. Once malware is executing on a user system, it can control every aspect of software on the user system, from what software programs execute on the system to what data the software programs receive, to how the software programs interact with system hardware.

Different types of malware can cause different problems for user systems. These problems can range from minor inconveniences, such as a decrease in system performance, to more serious problems, such as destruction of system files or theft of user information.

Anti-virus software and other monitoring software can be run on a user system to monitor for malware. However, any software running on a user system is vulnerable to being compromised by malware.

SUMMARY

This specification describes technologies relating to detecting and stopping viruses and other security breaches on a user system.

In general, one aspect of the subject matter described in this specification can be embodied in a device that includes an integrated processing unit, the integrated processing unit comprising: a user system comprising a first processor and a first computer storage medium; and an auditor system comprising: a second processor, wherein the second processor is isolated from the first processor; and a second computer storage medium, wherein the second computer storage medium is isolated from the first computer storage medium so that the user system is unable to access the second computer storage medium, and the second computer storage medium stores instructions that, when executed by the second processor, cause the second processor to perform operations comprising: loading auditing data in isolation from the user system, wherein the auditing data specifies signatures of unauthorized processes; monitoring processes on the user system, and determining from the auditing data that one of the processes is an unauthorized process; and performing one or more security processes on the unauthorized process.

These and other embodiments can each optionally include one or more of the following features. The second processor can be physically isolated from the first processor. The second computer storage medium can be physically isolated from the first computer storage medium. Determining that the process is an unauthorized process can include determining that the first processor is executing program instructions that are not associated with a process in a process table for the user system. The process table can be stored on the first computer storage medium. The auditing data can specify a threshold time for a particular process, and determining that the process is an unauthorized process can include determining that an actual time the user system takes to execute the particular process is longer than the threshold time. Determining that the process is an unauthorized process can include matching stored program data for the process to a signature of an unauthorized processes that is specified in the auditing data. Determining that the process is an unauthorized process can include detecting network traffic initiated by the process, and matching patterns in the network traffic to patterns associated with unauthorized processes in the auditing data. Monitoring processes on the system can include monitoring one or more of: process tables, physical memory allocations, virtual memory allocations, kernel code, process code, disk drives, cache data, or BIOS data stored on the first computer storage medium.

Performing one or more security processes on the unauthorized process can include terminating an unauthorized process. Terminating the unauthorized process can include determining an appropriate command using an application programming interface for an operating system on the user system, wherein the command instructs the operating system to terminate the unauthorized process; and sending the command to the operating system. Terminating the unauthorized process can include modifying, by the second processor, data stored in a process table on the first computer storage device to remove the unauthorized process from the process table. Terminating the unauthorized process can include storing in the user system, by the second processor, data identifying a region of the first computer storage medium used by the unauthorized process, the data indicating that instructions stored in the region of the first computer storage device should not be executed by the first processor. The data can be stored in one or more registers in the user system, wherein the registers are read-write registers for the auditor system and are read-only registers for the user system. Performing one or more security processes can include halting execution of the first processor.

In general, another aspect of the subject matter described in this specification can be embodied in a method that includes the actions of loading auditing data onto an auditor system, wherein the auditing data specifies signatures of unauthorized processes, and wherein the auditor system includes an auditor processor and an auditor computer storage medium; monitoring, with the auditor system, processes on a user system, and determining from the auditing data that one of the processes is an unauthorized process, wherein the user system includes a user processor and a user computer storage medium, the auditor processor is isolated from the user processor, and the auditor computer storage medium is isolated from the user computer storage medium; and performing, with the auditor system one or more security processes on the unauthorized process. Other embodiments of this aspect include corresponding systems, apparatus, and computer programs products recorded on computer storage devices, each configured to perform the operations of the methods.

These and other embodiments can each optionally include one or more of the following features. The auditor processor can be physically isolated from the user processor, and the auditor computer storage medium can be physically isolated from the user computer storage medium. Determining that the process is an unauthorized process can include determining that the user processor is executing program instructions that are not associated with a process in a process table for the user system. The process table can be stored on the user computer storage medium. The auditing data can specify a threshold time for a particular process, and determining that the process is an unauthorized process can include determining that an actual time the user system takes to execute the particular process is longer than the threshold time. Determining that the process is an unauthorized process can include matching stored program data for the process to a signature of an unauthorized processes that is specified in the auditing data. Determining that the process is an unauthorized process can include detecting network traffic initiated by the process, and matching patterns in the network traffic to patterns associated with unauthorized processes in the auditing data. Monitoring processes on the system can include monitoring one or more of: process tables, physical memory allocations, virtual memory allocations, kernel code, process code, disk drives, cache data, or BIOS data stored on the user computer storage device.

Performing one or more security processes on the unauthorized process can include terminating an unauthorized process. Terminating the unauthorized process can include determining an appropriate command using an application programming interface for an operating system on the user system, wherein the command instructs the operating system to terminate the unauthorized process; and sending the command to the operating system. Terminating the unauthorized process can include modifying, by the auditor processor, data stored in a process table on the user computer storage device to remove the unauthorized process from the process table. Terminating the unauthorized process can include storing in the user system, by the second processor, data identifying a region of the user computer storage device used by the unauthorized process, the data indicating that instructions stored in the region of the user computer storage device should not be executed by the first processor. The data can be stored in one or more registers in the user system, wherein the registers are read-write registers for the auditor system and are read-only registers for the user system. Performing one or more security processes can include halting execution of the first processor.

Particular embodiments of the subject matter described in this specification can be implemented so as to realize one or more of the following advantages. Because the auditor system is separate from the user system, the user system can be more effectively monitored. This means that malware that was previously undetectable, or at least undetectable while the user system was executing, can be detected while the user system is executing. The auditor system can stop the malware by requesting that an operating system running on the user system stop executing the malware. The auditor system can also stop the malware by directly modifying data stored in memory or in hardware registers of the user system to stop the malware from executing. This allows the auditor system to stop malware from executing even when the operating system has been compromised. The auditor system can stop malware on the user system, without requiring the user system to be turned off.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Integrated Processing Unit

Figure 1:
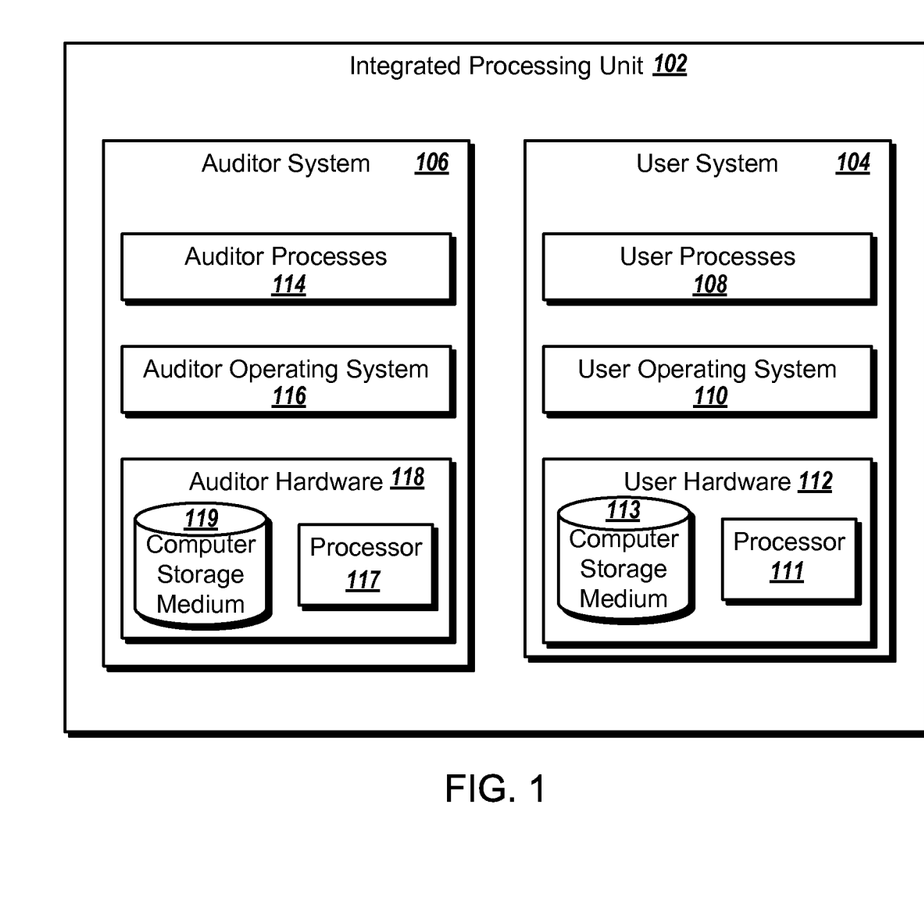
FIG. 1 illustrates an example integrated processing unit.

FIG. 1 illustrates an example integrated processing unit 102. The integrated processing unit is a single device that includes two isolated systems: a user system 104 and an auditor system 106. The systems can be, for example, physically or logically isolated. Integrated processing units can be used in various computing devices, for example, computers, mobile devices, set top boxes, digital video recorders (DVRs), game consoles, and other electronic devices.

The user system 104 runs user processes 108 through a user operating system 110 that runs on user hardware 112. The user hardware 112 includes a processor 111 and a computer storage medium 113, and may also include additional hardware, for example, registers (not shown), buses, etc. The user processes 108 include various programs, for example, word processors, web browsers, mail programs, and any other programs desired by a user. A user interacts with the user system 104 as a user would interact with any system running user programs.

The auditor system 106 runs auditor processes 114 through an auditor operating system 116 that runs on auditor hardware 118. The auditor hardware 118 includes an auditor processor 117 that is isolated from the user processor of the user system 104 so that the user processor is unable to access or control the auditor processor. The auditor hardware 118 also includes an auditor computer storage medium 119 that is isolated from the user computer storage medium of the user system 104, so that the user system 104 is unable to access the auditor computer storage medium. In some implementations, the auditor system 106 and user system 104 are configured so that the user system is completely unaware of the auditor system 106. The auditor hardware 118 can also include additional hardware, such as communication hardware (not shown) that can communicate over a wired or wireless network.

The isolation of the user computer storage medium and the auditor computer storage medium can be achieved through various means including, for example, logical isolation or physical isolation. Logical isolation can be achieved, for example, through virtualization of the auditor system and user systems.

Physical isolation can be achieved, for example, through separate memory chips and/or buses, or register-based controls. Physical isolation of the user processor and the auditor processor can be achieved, for example, by having two separate processors. As used herein, the term "physically isolated from" means that a first component (e.g., a processor or memory) cannot be accessed by a second component. However, the second component may be able to access the first component. Such physical isolation can be accomplished by one-way data communication devices, read and write restrictions, and the like. The user system 104 is thus unable to modify, and in some implementations unable to even access (e.g., read), data stored on the computer storage medium of the auditor system 106. This ensures that any malware running on the user system 104 cannot adversely affect the auditor system 106. In contrast, the auditor system 106 can access, and in some cases can modify, the user computer storage medium. This access allows the auditor system 106 to detect and stop unauthorized processes on the user system 104.

The auditor processes 114 monitor the user system 104 to determine when one or more unauthorized processes running on the user system 104. For example, the auditor processes 114 can monitor one or more of the process tables, physical and virtual memory allocations and mappings, running or runnable operating system (e.g., kernel) code, running or runnable process code, computer storage media, caches, the Basic Input/Output System (BIOS), and network traffic of the user system 104. While the auditor processes 114 are illustrated as being separate from the auditor operation system 116, one or more of the auditor processes 114 can be part of the auditor operating system 116. Additional details on detecting unauthorized processes are described below, with reference to §2.3.

The auditor processes 114 can also include one or more security processes that are executed when an unauthorized process is detected on the user system 104. These security processes can perform various actions including, for example, quarantining the unauthorized process, stopping the unauthorized process, stopping the user operating system 110, and pausing and restarting the user processor. Additional details on security processes are described below, with reference to §2.4.

The auditor system can optionally include integrated chip-level and operating system-level optimizations to maximize its capabilities and performance.

A user generally interacts with the user system, and will only interact with the auditor system when the user is verifying the integrity of the auditing system, updating the auditing system, or otherwise interacting with the auditing system for a specific, limited, purpose.

§2.0 Auditor System

As described above with reference to FIG. 1, the auditor system 106 monitors and secures the user system 104. To do this, the auditor system 106 must be able to securely load auditing data (i.e., in isolation from the user system), securely update auditing data, and securely monitor the user system 104.

§2.1 Example Auditing Process

Figure 2:
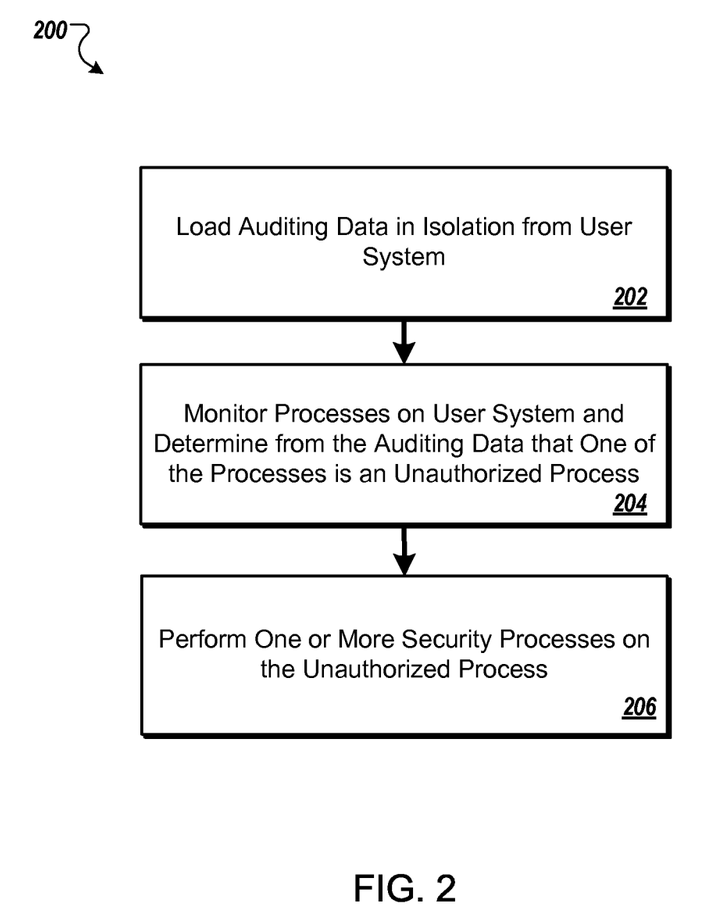
FIG. 2 is a flow diagram of an example auditor process for monitoring a user system.

FIG. 2 is a flow diagram of an example auditor process 200 for monitoring a user system. The auditor process can be implemented, for example, by the auditor system 106.

The auditor process 200 loads auditing data in isolation from a user system (202). The auditing data is data used by the auditor system to monitor the user system. The auditing data can include program files (e.g., executable process code) and/or data used by program files. Example program files include anti-virus software, data loss prevention software, and host intrusion prevention software. Example data used by program files include virus definition files, security content automation protocols, vulnerability assessment scripts, system configuration compliance policies, application white and black lists, trusted certificate chains for digital signature verification of files or messages, and license files for the auditor system.

Loading the auditing data in isolation from the user system means the user system has no control of, and in some implementations is unaware of, the loading. Example techniques for securely loading auditing data in isolation from the user system are described below in §2.2.

The auditor process 200 monitors processes on a user system and determines from the auditing data that one of the processes is an unauthorized process (204). An unauthorized process can be, for example, a process that is not supposed to be running on the user system, or a process that is taking an unauthorized action on the user system. Example techniques for monitoring the user system are described below in §2.3.

The auditor process 200 then performs one or more security processes on the unauthorized process (206). Example techniques for performing the one or more security processes are described below in §2.4.

§2.2 Securely Loading Auditing Data

The auditor system can receive the auditing data from various sources. For example, the auditing data can be received from a remote server connected to the auditor system through a network.

Figure 3:
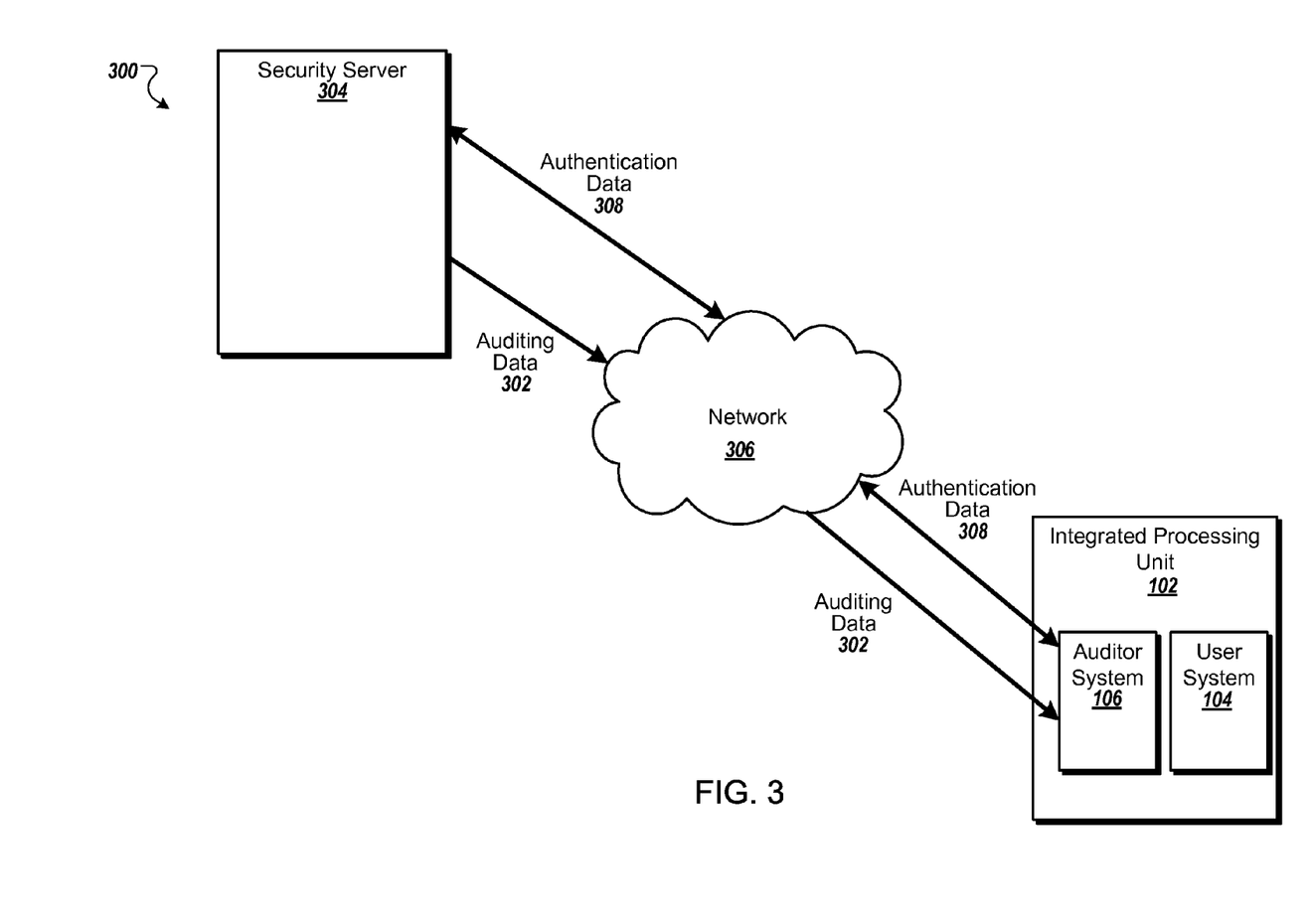
FIG. 3 illustrates an example system where the auditing data is stored in a security server remote from the auditor system.

FIG. 3 illustrates an example system 300 where the auditing data 302 is stored in a security server 304 remote from the auditor system 106. The auditor system 106 receives the auditing data 302 through a network 306.

The security server 304 is one or more computers, each of which includes one or more processors, a memory subsystem, and an input/output subsystem. The security server 304 is programmed to securely provide auditing data 304 to the auditor system 104 through the network 306.

To increase security, in some implementations, the auditor system verifies the legitimacy of the security server 304 using authentication data 308 received from the security server. The authentication data can take various forms. For example, the authentication data 308 received from the security server 304 can include a password or passphrase that authenticates the security server 304. Alternatively or additionally, the authentication data 308 can include a hash value summarizing the hardware and software configuration of the security server 304. This hash value can be generated, for example, from a trusted platform module running on the security server 304. Other authentication data, for example, digital signatures, can also be used. The auditor system 106 verifies the legitimacy of the security server 304 by comparing the authentication data 308 to verification data stored on the auditor server. If the data matches, the security server 304 is legitimate. Otherwise, the security server 304 is not legitimate.

In some implementations, the security server 304 also authenticates the auditor system 106 using authentication data 308 received from the auditor system 106. The authentication data 308 received from the auditor system 106 can be of a similar type as the authentication data 308 received from the security server 304.

In some implementations, the security server 304 and the auditor system 106 are connected through a secure connection, for example, a virtual private network. Alternatively or additionally, the auditing data 302 and optionally the authentication data can be encrypted or otherwise secured before being sent through the network. For example, conventional encryption algorithms can be used.

While FIG. 3 illustrates a system where the auditing data 302 is downloaded from a security server 304, other techniques for securely loading the auditing data can alternatively be used. For example, the auditor system 106 can receive the auditing data 302 from a device directly connected to the auditor system, for example, from a CD-ROM device, through a universal serial bus (USB) connection, or through other I/O components in the auditor system 106. Regardless of what technique is used to load the auditing data, the auditor system 106 loads the data in isolation from the user system 104, e.g., in a manner that cannot be influenced by the user system 104.

Once the data is stored on the auditor system 106, the auditor system 106 may occasionally be rebooted. Each time the auditor system 106 is rebooted, some or all of the auditing data is loaded from persistent storage (e.g., a disk or flash storage device) into memory. This loading is also done in isolation from the user system 104. In some implementations, the boot sequence is secured. For example, the auditor system 106 can validate the integrity of the auditing data before the data is loaded into memory. This validation can be done, for example, using trusted platform module verification, or other verification techniques.

§2.3 Detecting Unauthorized Processes

The auditor system 104 can employ various techniques to detect unauthorized processes. The techniques can depend on the type of process as well as how difficult the process is to detect.

Some unauthorized processes are easier to detect than others. The easiest unauthorized processes to detect are processes that run in the user system but do not actively work to avoid detection. Most viruses are an example of this kind of process. However, some unauthorized processes actively work to avoid detection. An example of this kind of unauthorized process is a root kit. An unauthorized process works to avoid detection, for example, by modifying reports of the system to make the process. For example, an unauthorized process can intercept all requests for a list of processes running on the system, obtain the list, and remove itself from the list before returning the list to the requestor.

Processes that do not actively work to avoid detection can generally be detected using modified forms of conventional virus detection techniques. Sometimes, these same techniques can be used to detect processes that work to avoid detection, but sometimes additional detection techniques are needed.

Figure 4:
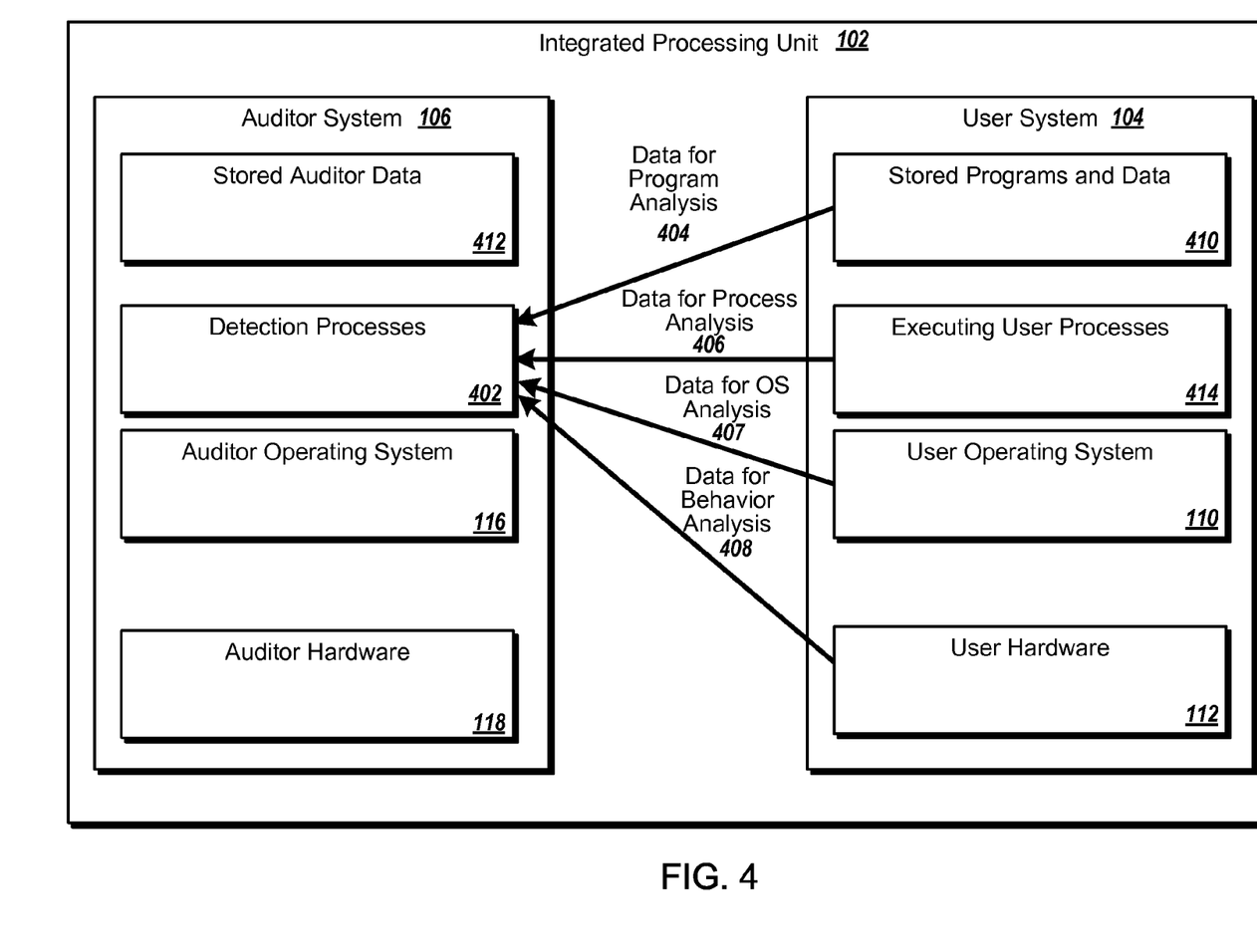
FIG. 4 illustrates an example of the types of data the auditor system monitors on the user system.

§2.3.1 Detecting Unauthorized Processes that do not Work to Actively Avoid Detection FIG. 4 illustrates an example of the types of data the auditor system 106 monitors on the user system 104. The illustrated data is processed by the auditor system 106 to determine when unauthorized processes are on the user system 104.

The auditor system 106 runs one or more detection processes 402. The detection processes 402 monitor the user system 104 and gather data. This data includes, but is not limited to, data on stored programs (e.g., executable process code) 404, data on executing processes 406, data on the operating system 407, and data on the behavior of the user system 408. The detection processes 402 compare the received data to stored data 412 and otherwise test the received data. The detection processes can determine whether stored executable processes (e.g., stored programs), executing process, or both, are unauthorized processes. The detection processes 402 can make this determination using various tests, examples of which are described below.

In some implementations, the detection processes 402 examine data for the stored programs 404 of the user system. The data for the stored programs 404 is received, for example, by examining the stored programs and data 410 on the user system. One test the detection processes 402 can perform is to compare data corresponding to each of the stored programs to virus signatures stored in the auditor system, for example, in the stored auditor data 412.

A virus signature is a data pattern—often a simple string of characters or bytes—that can be used to identify a particular file, process, or other electronic data. Examples of signatures include portions of a file, hashes of a file or hashes of portions of the file. The detection processes 402 generate a signature that is descriptive of a process stored on or executing on the system. The detection processes 402 then compare the signature to signatures of unauthorized processes stored in the auditor data 412 to determine whether the process is an unauthorized process. In some implementations, the detection processes 402 use heuristic algorithms that determine that the program data is sufficiently close to a virus signature, even if the program data does not identically match the virus signature.

Rather than matching the program data to virus signatures, the detection processes 402 can alternatively analyze the instructions in the stored programs themselves. If a program includes suspicious instructions, it can be immediately flagged as an unauthorized process, or flagged for further inspection by the detection processes 402. An example suspicious program instruction is an instruction to erase or reformat a primary hard drive. The detection processes 402 can match program instructions to a list of suspicious instructions to determine which instructions are suspicious.

In some implementations, the detection processes 402 can emulate execution of the stored programs and data in a controlled environment on the auditor system. For example, the programs can be emulated in a virtual machine environment where any actions taken by the programs affects only the virtual machine, and not the actual auditor system 106. The detection processes 402 monitor an emulated program to determine whether it takes actions that harm the system. If so, the detection processes 402 determine that the program is an unauthorized process. Example actions that harm a system include reformatting a hard drive without user consent and sending data over a network without user consent.

In some implementations, in addition to or instead of monitoring the data 404 for programs stored on the user system, the detection processes 402 can monitor data for executing processes 406, data on the operating system 407, and data on the behavior of the system 408. The data can be received by monitoring the executing user processes 414, user operating system 110, and/or the user hardware 112. The auditor system 106 receives this data by monitoring the hardware and process space on the user system 104 to examine what processes are running, what instructions the operating system is executing, and what memory and other hardware is being used. The detection processes 402 then analyze this data to identify suspicious activities. The suspicious activities can be defined, for example, in a file that is part of the stored auditor data 412. Example suspicious activities include network traffic (ingoing or outgoing) that exceeds a threshold amount, or memory usage outside the memory range expected for a currently active process. Other suspicious activities include activities that are typically not performed by the process, for example, a text editor reading data from encrypted files and then sending packets of data over the network, an active process communicating with operating system derivers when it has no legitimate reason to do so, an active process that makes unexpected calls to a system application programming interface, or a process that intercepts and process system application programming interface calls before the calls reach a target library procedure, when the process has no legitimate reason to do so.

As another example, the detection processes 402 can match patterns in network traffic to patterns of suspicious network traffic associated with unauthorized processes. The patterns of suspicious network traffic can be stored, for example, in the stored auditor data 412.

§2.3.2 Detecting Unauthorized Processes that Actively Work to Avoid Detection

In some cases, the detection processes 402 can detect unauthorized processes that work to actively avoid detection using the techniques described above. However, these techniques are not always effective when a process is trying to avoid detection. Therefore, the detection processes 402 can include additional detection processes specifically designed to detect processes that actively work to avoid detection.

Figure 5A:
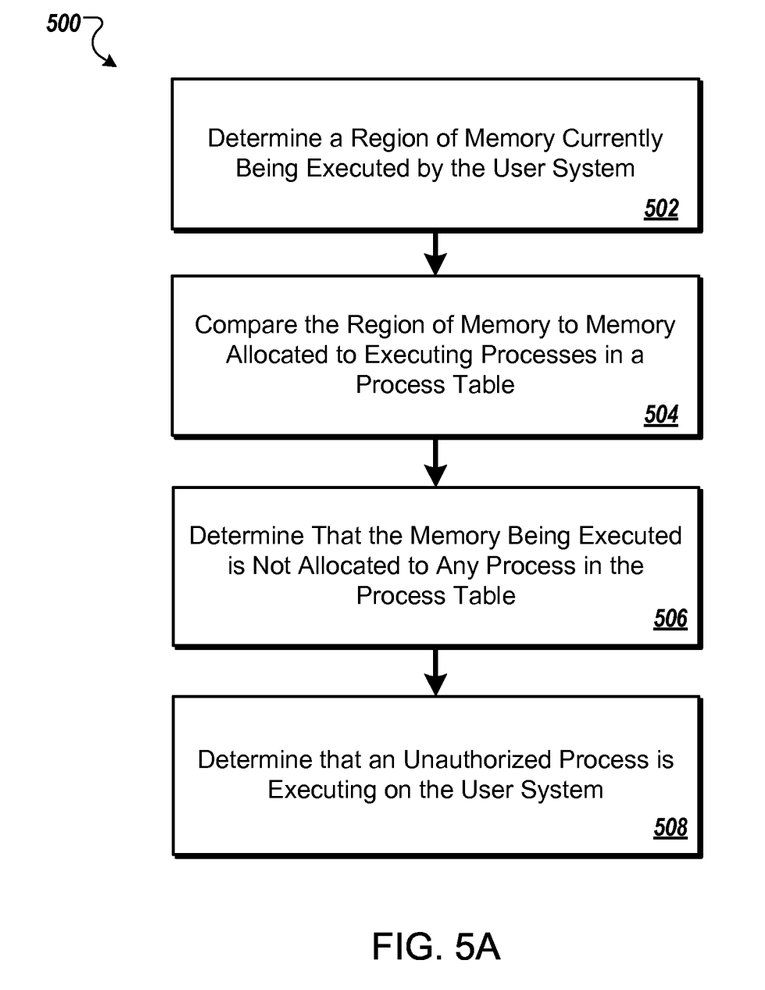
FIGS. 5A-5B illustrate two different detection processes for detecting unauthorized processes that actively work to avoid detection.
Figure 5B:
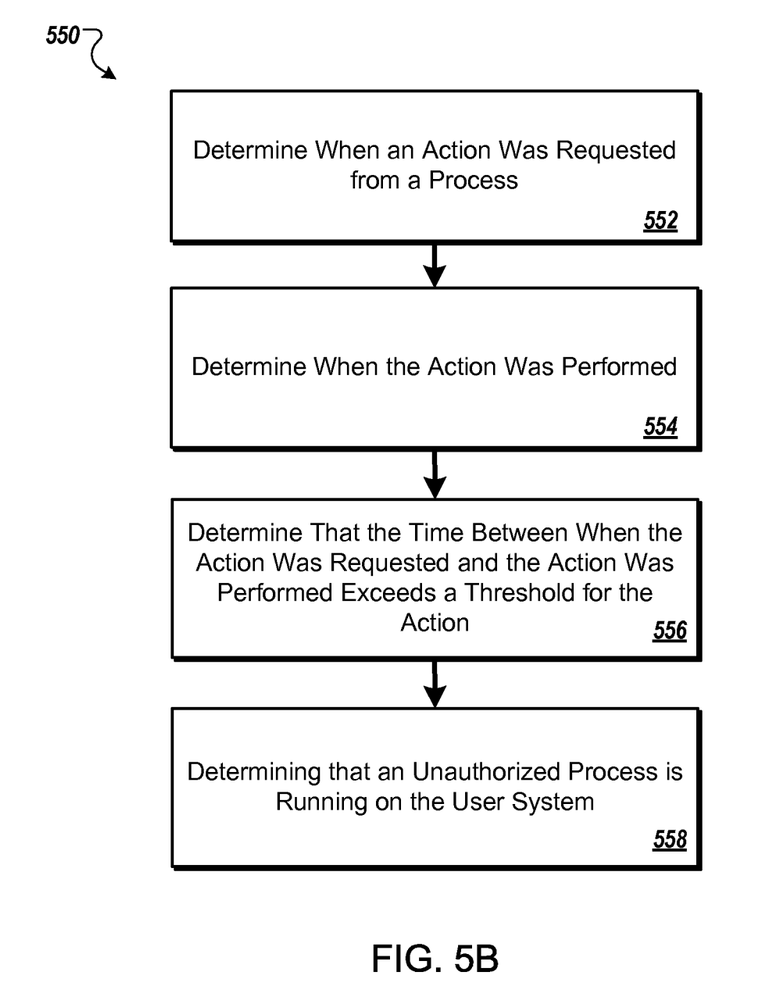

FIGS. 5A-5B illustrate two different detection processes for detecting unauthorized processes that actively work to avoid detection. Other processes can also be used.

FIG. 5A is a flow diagram of an example detection process 500 for determining that an unauthorized process is running on the user system when instructions executed by the user system are not stored in memory associated with any process running on the system. The detection process 500 can be implemented, for example, by the auditor system 106.

The detection process 500 determines a region of memory currently being executed by the user system (502). The detection process 500 can make this determination by analyzing the hardware of the user system to determine what instructions are currently being executed, and where the instructions are stored in memory.

The detection process 500 compares the region of memory to memory allocated to executing processes in a process table (504). The process table stores data for each executing process on the user system. This data can include, for example, an identifier for the process (assigned, for example, by the operating system), whether the process is currently executing, and a range of memory allocated to the process in which the process stores instructions for execution. The detection process 500 compares the region of memory to the regions in the process table, for example, by determining whether the region of memory is contained within one or more of the regions allocated to processes in the process table.

The detection process determines that the memory being executed is not allocated to any process in the process table (506). For example, suppose three processes (processes A, B, and C) are listed in the process table, and memory regions 1-5 are allocated to process A, memory regions 10-15 are allocated to process B, and memory regions 16-22 are allocated to process C. Memory regions 6-9 are not allocated to any process in the process table. If the memory being executed is in region 8, then the process 200 determines that the memory does not belong to any of the processes in the process table. The detection process then determines that an unauthorized process is executing on the user system (508).

FIG. 5B is a flow diagram of an example detection process 550 for determining that an unauthorized process is running on the user system according to timing tests. The detection process 550 can be implemented, for example, by the auditor system 106. The timing tests identify when user processes take longer to execute than expected. A delay in a user process is an indication that an unauthorized process may be running on the system and interfering with the user process.

The detection process 550 determines when an action was requested from a process on the user system (552). The detection process 550 makes this determination by monitoring calls to processes running on the user system. A call to a process occurs when the user operating system or another user process requests that a given process take a particular action. For example, when a user types in "ps" on a terminal on a LINUX™ machine, the operating system requests that the "ps" process provide a list of all processes running on the system.

The detection process 550 can determine the time that an action was requested by monitoring process calls and recording the time when every process call was made, or the time when particular process calls of interest are made. A process call of interest can be, for example, a process call that is particularly likely to be affected by an unauthorized process running on the system. For example, to avoid detection, many root kits remove themselves from the list of running processes when the "ps" command is issued. This can slow down the time the user system takes to respond to a "ps" request. Therefore, monitoring the timing of the "ps" process may be particularly effective at detecting a root kit. A list of the process calls of interest can be stored, for example, in data stored by the auditor system 104.

The detection process 550 determines when the action was performed (554). The detection process 550 makes this determination by monitoring the user system and determining when the requested action was completed.

The detection process 550 determines that the time between when the action was requested and when the action was performed exceeds a threshold amount of time for the action (556). The detection process 550 does this, for example, by taking the difference between the two times, and then comparing the difference to the threshold. The threshold can be process-dependent and can be defined, for example, in data stored by the auditor system. For example, if the threshold for the "ps" process is 5 milliseconds and the difference is 6 milliseconds, the system can determine that the time exceeds the threshold. The thresholds can be user system-dependent or can be determined in advance for multiple user systems. User system-dependent thresholds are determined, for example, by monitoring the time between when an action is requested and completed under conditions where the user system is known to be uncompromised by any unauthorized processes. Thresholds determined for multiple user systems can be determined, for example, according to system specifications for the hardware and software of the systems.

When the time exceeds a threshold amount of time, the detection process 550 determines that an unauthorized process is running on the user system (558).

While the above description describes comparing a single time to a threshold, the system can alternatively collect timing data corresponding to multiple requests of an action. The system can then aggregate the collected times, for example, by summing or averaging the times, and then compare the sum or average to a threshold. The system can alternatively compare other statistics for the collection of times, for example, standard deviation, median time, or mode time, to a threshold.

FIGS. 5A and 5B illustrate two example methods for detecting unauthorized processes. However, other methods could look for other indications that unauthorized processes are running. These other indications include, for example, one or more of processor use (e.g., is the processor being used more than an expected amount), how much time an operating system spends executing instructions (e.g., is the operating system using more or less time than expected), how often the processor interrupts (e.g., is the processor switching between processes more or less than expected), how much network bandwidth is used (e.g., is more or less bandwidth being used than expected), how much disk space is used (e.g., is more or less disk space used than expected), how frequently data is read or written to disk (e.g., is data being read or written more or less frequently than expected), The expected values for the above data can be determined, for example, from an analysis of an uncompromised system.

§2.4 Performing Security Processes

Once the auditor system detects an unauthorized process, the auditor system can perform various security processes on the unauthorized process. For example, if the system detects a program file corresponding to an unauthorized process, the system can quarantine the file. Quarantining a file includes isolating the file, for example, by moving it to a different section of memory on the user device, where the contents of the file cannot be executed. Quarantining a file can also include marking the file as non-executable, or otherwise disabling the user system from executing the file. The system can also remove the file, for example, by deleting it from the user system.

In some implementations, the auditor system detects that a process currently executing on the system is an unauthorized process. In these implementations, the auditor system can perform a security process by stopping the executing process. The auditor system stops a process in various ways. In general, the ways correspond to the extent to which the auditor system has been compromised. Example security processes for stopping an unauthorized process are described below.

Figure 6A:
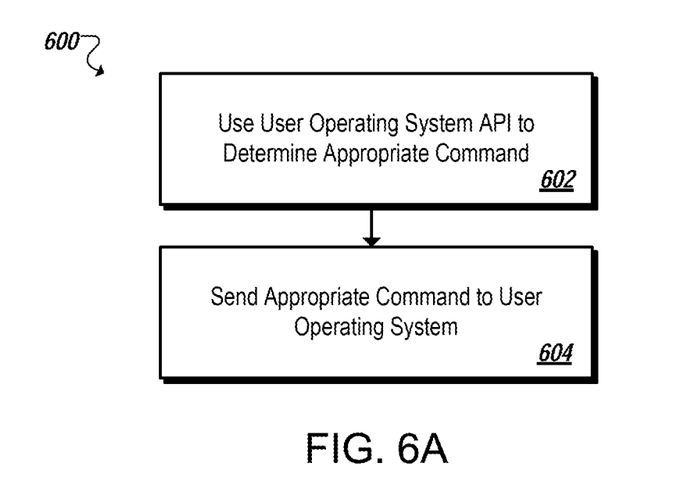
FIGS. 6A-6C are flow diagrams of example security processes for stopping an unauthorized process.

FIG. 6A is a flow diagram of an example security process 600 for stopping an unauthorized process. The security process 600 can be implemented, for example, by the auditor system 106.

The security process 600 uses an application programming interface (API) for the user operating system to determine an appropriate command (602). The appropriate command is the one that will cause the operating system to terminate the unauthorized process. The API lists one or more commands recognized by the operating system, and specifies the parameters needed by the commands. The security process 600 uses the API to determine both the appropriate command and the needed parameters for the command. For example, if the appropriate command is "kill (process_id)," where process_id is the identifier assigned to the process by the operating system, the security process 600 retrieves the process id (for example, from the process table) and formats the command appropriately.

The security process 600 then sends the appropriate command to the user operating system (604). The security process 600 can send the appropriate command to the user operating system using various techniques. For example, in some implementations, the security process 600 causes data to be written to a secure command register in the user system. In these implementations, the user operating system is configured to read that command register and execute the instructions. The user operating system can be configured to periodically read the register, or read the register upon interrupt from the auditor system. In other implementations, the security process 600 sends commands according to a pre-established protocol, for example, sends commands (optionally encrypted commands) using protocols such as Secure Shell (SSH), telnet, remote desktop protocol (RDP), user datagram protocol (UDP) or transmission control protocol (TCP). In still other implementations, the security process 600 can use a proprietary communication path between the auditor system and the user operating system. This can be a specialized one-way communication path that is not visible or usable to any system other than the auditor system.

Figure 6B:
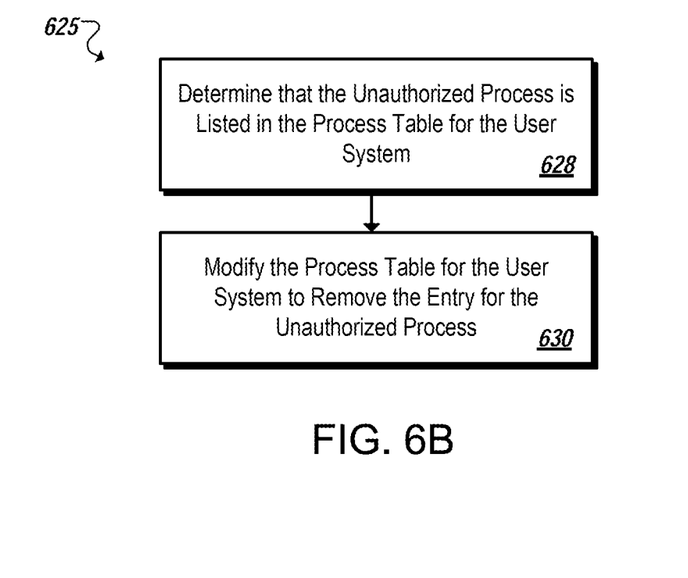

FIG. 6B is a flow diagram of an example security process 625 for stopping an unauthorized process. This security process can be used to stop an unauthorized process that appears in a process table for the system. The security process 625 can be implemented, for example, by the auditor system 106.

The security process 625 determines that the unauthorized process is listed in the process table for the user system (628). The security process 625 makes this determination, for example, by comparing data it has for the unauthorized process to the process table. The data can include, for example, a process identifier or a region of memory executed by the process. If a process in the process table matches the data for the unauthorized process, the 20 security process 625 determines that the unauthorized process is listed in the process table.

The security process 625 modifies the process table for the user system to remove the entry for the unauthorized process (630). The security process 625 modifies the process table, for example, by directly accessing the user system memory storing the process table and deleting, or overwriting, the data corresponding to the unauthorized process.

Once the process table is modified, the user operating system can continue executing processes in the process table as normal, as if it had removed the unauthorized process itself.

Figure 6C:
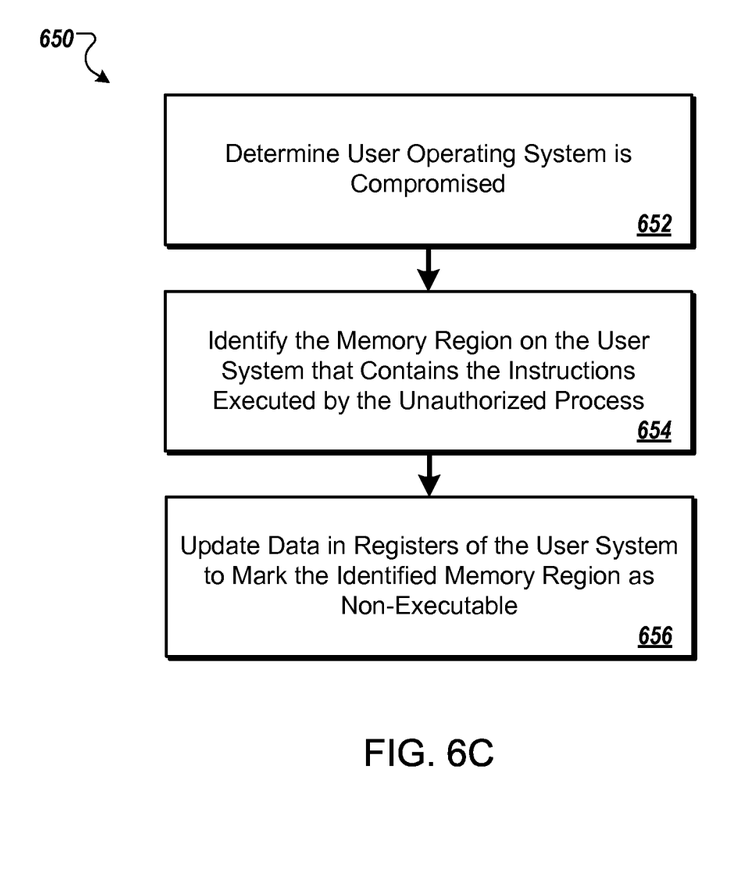

FIG. 6C is a flow diagram of an example security process 650 for stopping an unauthorized process. The security process 650 can be implemented, for example, by the auditor system 106.

The security process 650 determines that the user operating system is compromised (652). The security process 650 makes this determination by comparing a description of system activity received from the operating system to the actual system activity detected by the auditor system. The description can be, for example, a list of processes executing on the user system, details on disk space for the user system, or details on memory usage of the user system. If the description from the user operating system does not match the actual system activity, the security process 650 can determine that the user operating system is compromised. For example, if the system is executing instructions stored in a region of memory on the user system, but a list of the processes executing on the system received from the operating system does not include a process executing instructions from that region of memory, the security process 650 can determine that the operating system is compromised.

The security process 650 identifies the memory region on the user system that contains the instructions being executed by the unauthorized process (654). The security process 650 can receive the identification of the memory region, for example, from one of the detection processes described above. Alternatively, the security process 650 can monitor the system itself to determine the appropriate region of memory.

The security process 650 updates data in the registers of the user system to mark the identified memory region as non-executable (656). For example, if the user system includes registers that identify non-executable regions of memory, the security process 650 can add data to the registers that specifies the identified region of memory. Because this modification is made external to the operating system and affects what code can be executed by the operating system, the security process 650 is able to stop the process without relying on the operating system.

In some implementations, rather than individually stopping the process, the auditor system stops the user operating system itself, or pauses and restarts the user processor.

While the user operating system is stopped, or the user processor is paused, the auditor system can take one or more actions to remove the unauthorized process from the user system. For example, the auditor system can restore the user system to a restore point, e.g., a previously saved point before the system was infected. As another example, the auditor system can attempt to remove the unauthorized process from the system, e.g., by deleting infected files, while the system is stopped. The auditor system may also just stop the user operating system, for example, using an orderly shutdown process, and take no further action.

In some implementations, the auditor system can automatically present feedback to a user letting him or her know that a situation is being corrected on the user system, for example, by causing the control switch to switch to presenting output from the auditor system, as described below with reference to section 3.2.

§3.0 Monitoring the Auditor System

The auditor system can have a great deal of control over the user system. Therefore, users may want to be able to monitor the auditor system itself, in order to ensure that the auditor system is functioning correctly.

§3.1 Log Files

This monitoring can be achieved in various ways. For example, the auditor system 106 can automatically generate various log files. These log files can include entries that indicate when auditing data was loaded onto the auditor system, and when the auditing data was updated. For example, an entry could specify the time of the loading of the data (e.g., the date, or the date and time), the source of the auditing data (e.g., an identification of the server or device from which the data was received), and an identification of the auditing data itself (e.g., a version number).

The log files can alternatively or additionally include entries that indicate when unauthorized processes were detected. For example, an entry could specify the time that an unauthorized process was detected, an identification of the unauthorized process (e.g., a name or other identifier) an identification of the detection process that detected the unauthorized process, and details about the detection (e.g., what the detection process observed and what auditor data the detection process relied upon).

The log files can alternatively or additionally include entries that indicate when, or what, security processes were initiated against an unauthorized process. For example, an entry could specify the time that a security process was initiated, an identification of the unauthorized process, and an identification of the security process that was initiated.

§3.2 Interacting with the Auditor System

Figure 7:
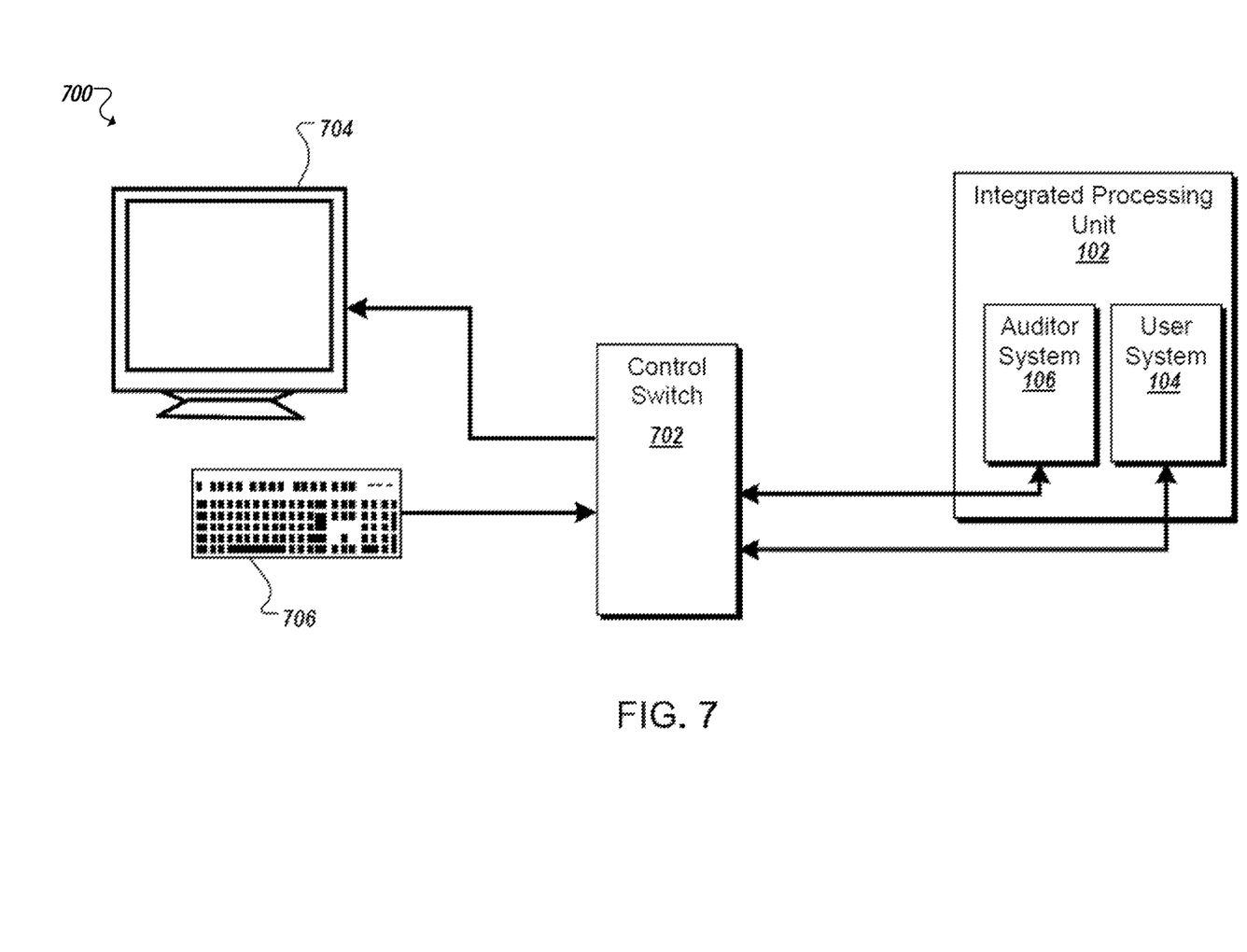
FIG. 7 illustrates an example system where a user can separately interact with the auditor system and the user system.

As another example, a user may want to be able to directly interact with the auditor system. FIG. 7 illustrates an example system 700 where a user can separately interact with the auditor system and the user system.

The system 700 includes a control switch 702 that connects both the auditor system 106 and the user system 104 to a display device 704 and input device 706. For illustrative purposes, the display device 704 is shown as a monitor, and the input device 706 is shown as a keyboard; however, any display device or input device can be used. Multiple display devices and input devices can also be used.

The control switch 702 is connected to both the auditor system 106 and the user system 104. The connection allows the control switch 702 to receive output from both systems and provide input to both systems.

A user indicates that the control switch should switch between the auditor system 106 and the user system 104, e.g., using a hardware control such as a button. When the user has indicated that the control switch should connect to the auditor system, the control switch routes the output received from the auditor system 106 to the display device 704, and routes input received from the input device 705 to the auditor system 106. Similarly, when the user has indicated that the control switch should connect to the user system 104, the control switch 702 routes output received from the user system 104 to the display device 704, and routes input received from the input device 706 to the user system 104.

The control switch 702 thus allows the user to interact separately with the auditor system 106 and the user system 104. During normal operation, the user will interact with just the user system 104. However, when the user wants to monitor the auditor system, for example, by reviewing log files, checking what files are stored on the auditor system, or performing other monitoring, the user can use the control switch 702 to switch to the auditor system. Once the monitoring is complete, the user can use the control switch 702 to switch back to the user system 104.

While the above describes a physical switch that connects physical input and display devices to the user and auditor systems, input and output could also be sent and received through a network, for example, for remote monitoring of systems.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer device comprising:
   an integrated processing unit, the integrated processing unit comprising:
      a user system comprising a first processor and a first computer storage medium; and
      an auditor system comprising:
         a second processor, wherein the second processor is isolated from the first processor; and
         a second computer storage medium, wherein the second computer storage medium is isolated from the first computer storage medium so that the user system is unable to access data stored on the second computer storage medium, and the second computer storage medium stores instructions that, when executed by the second processor, cause the second processor to perform operations comprising:
            receiving auditing data from a remote source over a secure communication channel;
            loading the auditing data in isolation from the user system, wherein the auditing data specifies signatures of unauthorized processes and the user system is restricted from influencing loading of the auditing data onto the auditor system;
            monitoring processes on the user system, and determining from the auditing data that one of the processes is an unauthorized process; and performing one or more security processes on the unauthorized process.

2. The device of claim 1, wherein the second processor is physically isolated from the first processor and the second computer storage medium is physically isolated from the first computer storage medium.

3. The device of claim 1, wherein determining that the process is an unauthorized process comprises determining that the first processor is executing program instructions that are not associated with a process in a process table for the user system, and wherein the process table is stored on the first computer storage medium.

4. The device of claim 1, wherein the auditing data specifies a threshold time for a particular process, and determining that the process is an unauthorized process comprises determining that an actual time the user system takes to execute the particular process is longer than the threshold time.

5. The device of claim 1, wherein determining that the process is an unauthorized process comprises matching stored program data for the process to a signature of at least one unauthorized process specified in the auditing data.

6. The device of claim 1, wherein determining that the process is an unauthorized process comprises detecting network traffic initiated by the process, and matching patterns in the network traffic to patterns associated with unauthorized processes in the auditing data.

7. The device of claim 1, wherein monitoring processes on the system include monitoring one or more of: process tables, physical memory allocations, virtual memory allocations, kernel code, process code, disk drives, cache data, or BIOS data stored on the first computer storage medium.

8. The device of claim 1, wherein performing one or more security processes on the unauthorized process comprises terminating the unauthorized process.

9. The device of claim 8, wherein terminating the unauthorized process comprises:
determining an appropriate command using an application programming interface for an operating system on the user system, wherein the command instructs the operating system to terminate the unauthorized process; and
sending the command to the operating system.

10. The device of claim 8, wherein terminating the unauthorized process comprises modifying, by the second processor, data stored in a process table on the first computer storage device to remove the unauthorized process from the process table.

11. The device of claim 8, wherein terminating the unauthorized process comprises storing in the user system, by the second processor, data identifying a region of the first computer storage medium used by the unauthorized process, the data indicating that instructions stored in the region of the first computer storage device should not be executed by the first processor.

12. The device of claim 11, wherein the data is stored in one or more registers in the user system, wherein the registers are read-write registers for the auditor system and are read-only registers for the user system.

13. The device of claim 1, wherein performing one or more security processes comprises halting execution of the first processor.

14. A computer-implemented method, comprising:
loading auditing data onto an auditor system, wherein the auditing data is received from a remote source over a secure communication channel and specifies signatures of unauthorized processes, and wherein the auditor system includes an auditor processor and an auditor computer storage medium;

monitoring, with the auditor system, processes on a user system, and determining from the auditing data that one of the processes is an unauthorized process, wherein the user system includes a user processor and a user computer storage medium, the auditor processor is isolated from the user processor, and the auditor computer storage medium is isolated from the user computer storage medium, wherein the user system is restricted from influencing loading of the auditing data onto the auditor system; and
performing, with the auditor system one or more security processes on the unauthorized process.

15. The method of claim 14, wherein the auditor processor is physically isolated from the user processor and the auditor computer storage medium is physically isolated from the user computer storage medium.

16. The method of claim 14, wherein determining that the process is an unauthorized process comprises determining that the user processor is executing program instructions that are not associated with a process in a process table for the user system, and wherein the process table is stored on the user computer storage medium.

17. The method of claim 14, wherein the auditing data specifies a threshold time for a particular process, and determining that the process is an unauthorized process comprises determining that an actual time the user system takes to execute the particular process is longer than the threshold time.

18. The method of claim 14, wherein determining that the process is an unauthorized process comprises matching stored program data for the process to a signature of at least one unauthorized process specified in the auditing data.

19. The method of claim 14, wherein determining that the process is an unauthorized process comprises detecting network traffic initiated by the process, and matching patterns in the network traffic to patterns associated with unauthorized processes in the auditing data.

20. The method of claim 14, wherein monitoring processes on the system include monitoring one or more of: process tables, physical memory allocations, virtual memory allocations, kernel code, process code, disk drives, cache data, or BIOS data stored on the user computer storage device.

21. The method of claim 14, wherein performing one or more security processes on the unauthorized process comprises terminating the unauthorized process.

22. The method of claim 21, wherein terminating the unauthorized process comprises:
determining an appropriate command using an application programming interface for an operating system on the user system, wherein the command instructs the operating system to terminate the unauthorized process; and
sending the command to the operating system.

23. The method of claim 21, wherein terminating the unauthorized process comprises modifying, by the auditor processor, data stored in a process table on the user computer storage device to remove the unauthorized process from the process table.

24. The method of claim 21, wherein terminating the unauthorized process comprises storing in the user system, by the second processor, data identifying a region of the user computer storage device used by the unauthorized process, the data indicating that instructions stored in the region of the user computer storage device should not be executed by the first processor.

25. The method of claim 24, wherein the data is stored in one or more registers in the user system, wherein the registers are read-write registers for the auditor system and are read-only registers for the user system.

26. The method of claim 14, wherein performing one or more security processes comprises halting execution of the first processor.

27. The method of claim 14, wherein the method further comprises mutually authenticating the remote source with the auditor system.

* * * * *